R. G. DOWINS.
METER REGISTER COMPENSATING FOR PRESSURE VARIATIONS.
APPLICATION FILED JAN. 21, 1911.

996,471.

Patented June 27, 1911.

3 SHEETS—SHEET 1.

Witnesses
J. L. Wright
V. B. Hillyard

Inventor
Richard G. Dowins,
By Victor J. Evans
Attorney

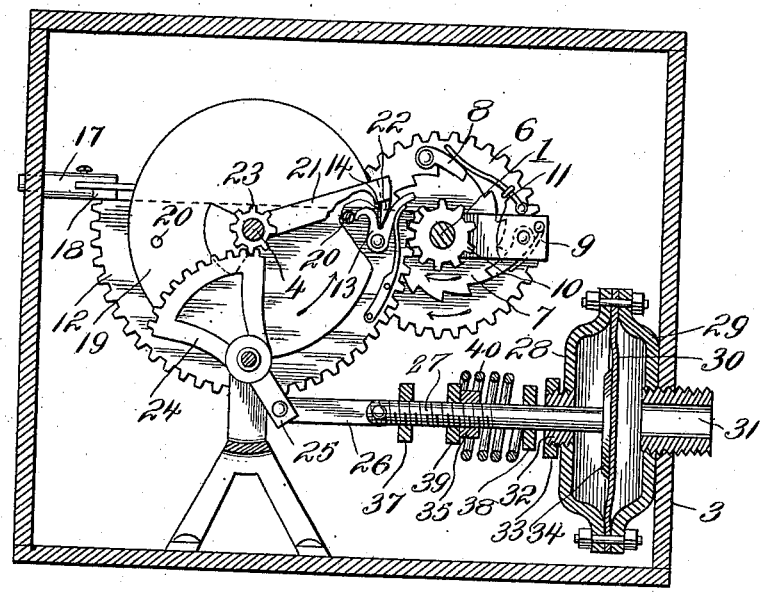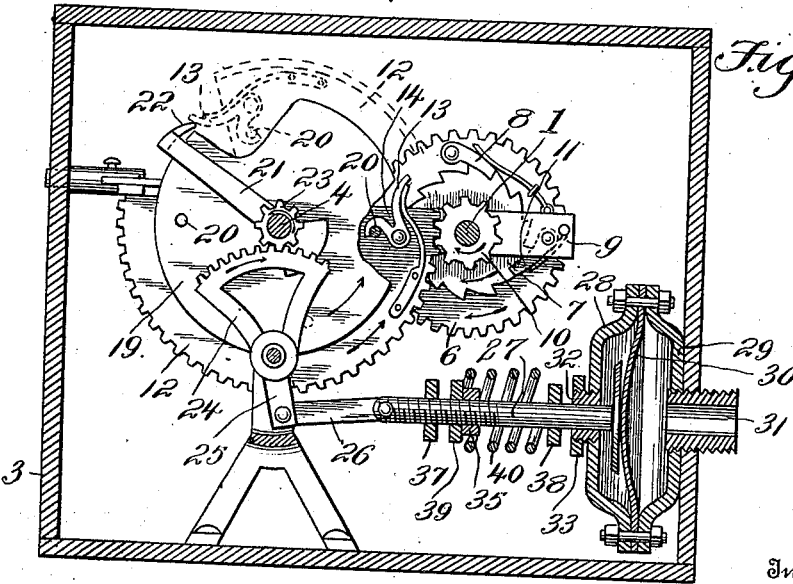

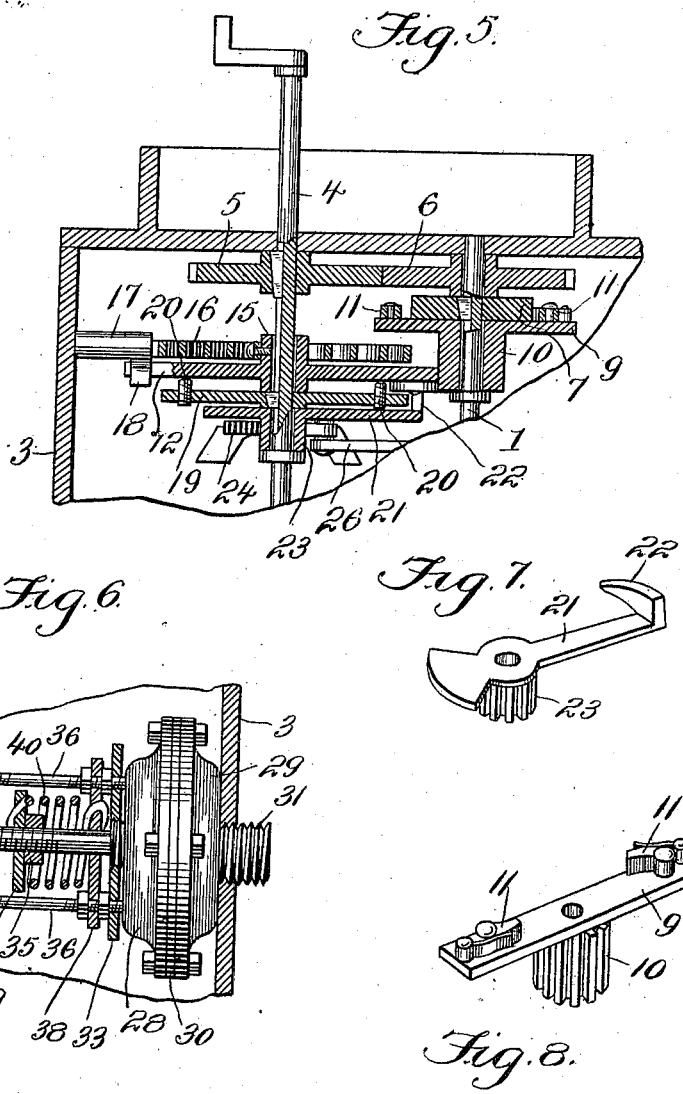

UNITED STATES PATENT OFFICE.

RICHARD G. DOWINS, OF NEODESHA, KANSAS.

METER-REGISTER COMPENSATING FOR PRESSURE VARIATIONS.

996,471.          Specification of Letters Patent.     Patented June 27, 1911.

Application filed January 21, 1911. Serial No. 603,881.

*To all whom it may concern:*

Be it known that I, RICHARD G. DOWINS, a citizen of the United States, residing at Neodesha, in the county of Wilson and State of Kansas, have invented new and useful Improvements in Meter-Register Compensating for Pressure Variations, of which the following is a specification.

The present invention provides a mechanism designed to automatically calculate and register the amount of gas, air or other elastic fluid in cubic feet passing through a meter at a higher pressure than the pressure to be maintained as per agreement between the contracting parties. The standard by which natural gas is measured, is four ounces per square inch and the amount is calculated by pressure and volume as registered by mechanisms designed for this purpose.

The present invention provides a mechanism which is operated by the movement of the meter and which calculates and registers the amount passed through the meter by the pressure of the gas, air, or other fluid which acts upon and operates and controls certain parts independently of the movement controlled by the meter, thereby causing the registering shaft to move forward at a greater speed than the regular meter movement proportionately to the excess of pressure of the gas or air over and above the standard pressure or that agreed upon. This combined movement of the registering shaft results in determining the full amount of gas passing through the meter instead of only a portion of the amount as registered by the meter movement, which is the case with meters as generally constructed. To determine the equivalent volume at standard pressure of gas passing through the meter where the pressure is above a given point it is necessary to estimate the amount passed at the excess of pressure over and above the standard of four ounces per square inch, thereby requiring a system of calculation which is both expensive, trying and time consuming.

The invention consists of the novel features, details of construction and combination of parts, which hereinafter will be more particularly set forth, illustrated in the accompanying drawings, and pointed out in the appended claims.

Figure 1:
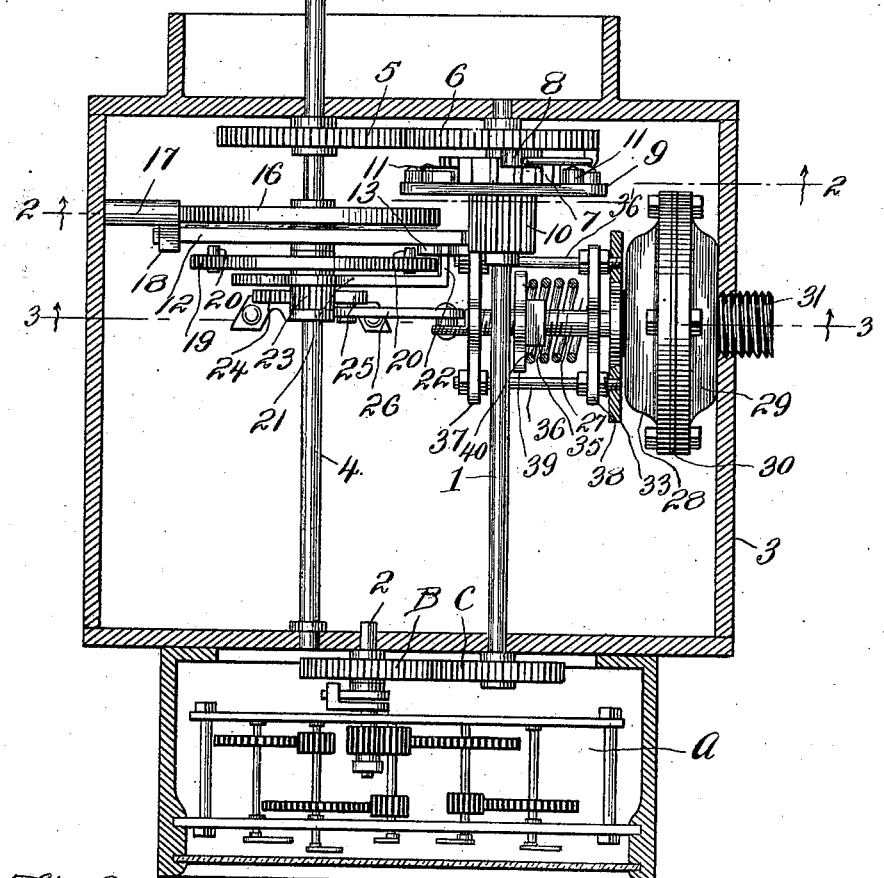
Figure 2:
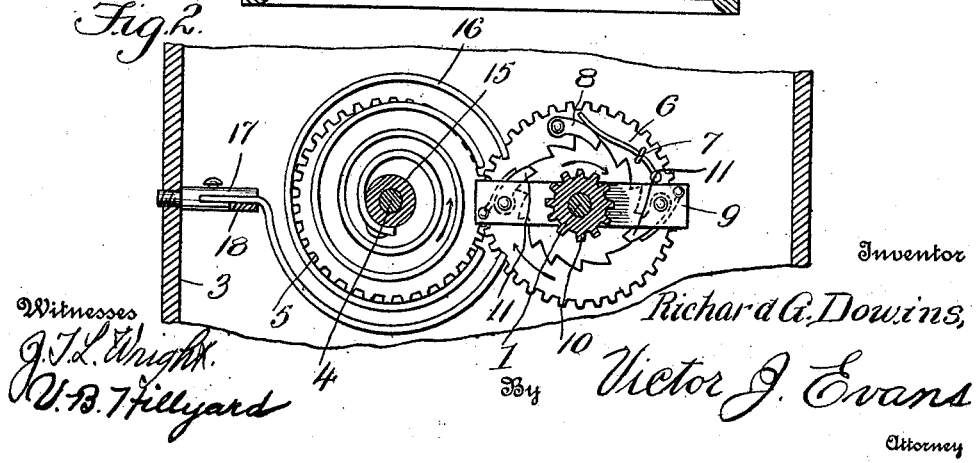

Referring to the drawings, forming a part of the specification, Figure 1 is a top plan view of a mechanism embodying the invention, the housing and a part of the movement being in horizontal section. Fig. 2 is a sectional detail on the line 2—2 of Fig. 1. Fig. 3 is a transverse section on the line 3—3 of Fig. 1, showing the normal position of the parts. Fig. 4 is a view similar to Fig. 3, showing the position of the parts when actuated by the excessive meter pressure. Fig. 5 is a horizontal section, showing more clearly the relationship of the elements comprising the movement and the manner of mounting the same. Fig. 6 is a detail view of the mechanism operated by excessive meter pressure for throwing the tally operating mechanism into operation. Fig. 7 is a detail perspective view of the device for throwing the stop carried by the semi-circular gear out of operative position. Fig. 8 is a detail perspective view of the device for transmitting movement to the tally operating shaft.

Corresponding and like parts are referred to in the following description, and indicated in all the views of the drawings, by the same reference characters.

The letter A represents a tally or registering mechanism for indicating the volume of air, gas, or other elastic fluid passing through the meter. The operating mechanism for actuating the registering mechanism is connected to the latter by suitable means including two gear wheels B and C. The movement of the registering mechanism is mounted in a frame separate from the movement of the operating mechanism, this being preferred, although not essential. A shaft 1 has the gear wheel C secured thereto, said gear wheel having its teeth meshing with the teeth of the gear wheel B, which is mounted upon a shaft 2 forming part of the tally mechanism. The tally or registering mechanism A may be of any type or make and is adapted to be operated by the meter movement and by the mechanism intermediate the meter movement and the tally movement so as to register the volume of gas or like fluid passing through the meter in excess of the standard or predetermined pressure.

The shaft 1 is mounted in a framework 3, which receives the mechanism intermediate the meter and tally movements for operating the latter. A shaft 4 is mounted in the frame 3 parallel with the shaft 1 and has a gear wheel 5 fastened thereto and in mesh with a gear wheel 6 loose upon the shaft 1, both gear wheels 5 and 6 being of like diameter and provided with a like number of teeth. The shaft 4 is extended and adapted to be connected with the meter movement in any manner to be operated thereby. A ratchet wheel 7 is secured upon the shaft 1 to turn therewith and its teeth are engaged by a pawl 8 mounted upon the gear wheel 6. It will thus be understood that under normal conditions, that is when the gas passing through the meter is at standard pressure, the shaft 4 turning at the same speed as the registering shaft of the meter will cause the shaft 1 to turn at a like speed and the tally or registering mechanism A to be operated so as to register a volume equal to that indicated by the meter. Under abnormal conditions, that is when the pressure of the gas or other elastic fluid passing through the meter is in excess of the standard or predetermined pressure, the operating mechanism now to be described is brought into play to cause the shaft 1 to rotate faster than the shaft 4 so that the tally mechanism will register an amount approximating the volume of gas passing through the meter reduced to standard pressure. A cross bar 9 is mounted loosely upon the shaft 1 and is provided upon one side with a pinion 10 and upon its opposite side at its outer ends with pawls 11, which are adapted to coöperate with the teeth of the ratchet wheel 7 to move the same when the operating mechanism is actuated by excessive pressure of the gas passing through the meter. The pinion 10 meshes with a half gear wheel 12, which is mounted loosely upon the shaft 4 and is provided near one corner with a pivoted stop 13 having a V-shaped notch 14 for a purpose presently explained. The half gear wheel 12 has a hub 15 at one side upon which is mounted a coil spring 16, one end of the spring being secured to the hub 15 and the opposite end made fast to a post 17 projecting from a part of the frame 3. The coil spring 16 serves to hold the half gear wheel 12 in a given relative position. A stop 18 projects laterally from the post 17 and is adapted to engage a corner portion of the half gear wheel 12 to hold the latter in a given position. A disk 19 is fastened to the shaft 4 to turn therewith and has pins 20 at opposite points to engage the pivoted stop 13 so as to turn the half gear wheel 12. A bar 21 is mounted loosely upon the shaft 4 and has a wedge shaped projection 22 at its outer end to project across the disk 19 and engage the stop 13 of the half gear 12 to hold said stop out of the path of the pins 20. A pinion 23 at one side of the bar 21 is secured thereto and is loose upon the shaft 4, the bar 21 and pinion 23 turning as one part. A toothed sector 24 is mounted adjacent the shaft 4 in position to have its teeth mesh with the teeth of the pinion 23, said sector having an arm 25 to which a link 26 is connected, said link making connection at its opposite end with a rod 27 controlled in its movement by excessive pressure within the meter or channels thereof.

A casing is mounted upon the frame 3 and comprises two plates 28 and 29, which have their edge portions secured by suitable fastenings and their middle portions outwardly deflected to form a chamber. A diaphragm 30 is secured between the plates 28 and 29 and divides the chamber into two parts. The plates 28 and 29 have central apertures which are threaded. A nipple 31 is threaded into the opening of the plate 29 and into an opening of the frame 3 and is adapted to have the pipe leading from the meter or main line connected thereto. A nipple 32 is threaded into the opening of the plate 28 and forms a guide for the rod 27 and a support for a bar 33. The rod 27 has a disk 34 at its inner end which bears against the diaphragm 30. A nut 35 is threaded upon the outer portion of the rod 27 and constitutes an adjustable stop. Bolts or pins 36 are secured to the bar 33 and are connected at their opposite ends by means of a bar 37, which has a central opening for the passage of the rod 27 and forms a guide therefor. A bar 38 is mounted loosely upon the rod 27 and the pins 36. A bar 39 is loose upon the rod 27 and engages the stop 35, which consists of a nut having screwthread connection with the rod 27. A helical spring 40 is mounted upon the rod 27 and has its end portions connected to the bars 38 and 39. When the tension of the spring 40 is overcome by the pressure upon the diaphragm 30 the rod 27 is moved outward and imparts a movement to the toothed sector 24, which latter imparts a proportionate movement to the pinion 23 and bar 21, thereby moving the projection 22 away from the stop 13 so that the pins of the disk 19 may engage the stop 13 and turn the half gear wheel 12 and operate the pinion 10 and cross bar 9, thereby causing the shaft 1 to rotate faster than the shaft 4 by engagement of the pawls 11 with the ratchet wheel 7. It is noted that the half gear wheel 12 is of larger diameter than the gear wheel 5 and meshing with the pinion 10 will cause the latter to rotate faster than the shaft 4. The cross bar 38 is fixed and the cross bar 39 movable. The effective tension of the spring 40 is regulated by the position of the nut or stop 35 upon the rod 27. When the pressure upon the right hand side of the diaphragm 30 is reduced the spring 40 moves the bar 27 inward, thereby restoring the parts to normal position.

In practice the meter tally is removed from the position connecting the same with the meter movement and the shaft 4 is connected with the usual crank shaft projecting through the walls of the meter for tally connection. The frame or casing 3 is made fast to the meter body in position to enable all the parts of the connection and movement to work in a proper manner. The tally registering mechanism removed from the meter is indicated at a. The pressure from within the meter is transmitted by means of a pipe to the nipple 31. The number of revolutions of the meter crank shaft is to be adjusted by proper choice of gears to correspond to the movement of the tally operating mechanism, which is figured on a basis of three to one, that is three revolutions of the meter crank shaft to a registering of one thousand cubic feet on the tally. As this machine is based on the movement of three to one proper gearing is necessary to estimate or register amounts on other meters having a faster or slower movement. The movement of the meter is transmitted to the shaft 4 by suitable connections. The movement imparted to shaft 4 is transmitted to shaft 1 by means of the gear wheels 5 and 6, pawl 8 and ratchet wheel 7, said movement being transmitted from shaft 1 to the tally or registering mechanism by means of the gear wheels B and C. As the shaft 4 rotates corresponding movement is imparted to the disk 19, which is secured thereto. Under certain conditions of gas pressure, that is when the latter is in excess of the standard or predetermined pressure, the bar 21 is operated to withdraw the wedge projection 22 carried thereby from the notch 14 of the stop 13, thereby permitting the latter to extend across the path of the pins 20 to be engaged thereby as the disk 19 turns, thereby causing the half gear wheel 12 to rotate. Under normal conditions the wedge projection 22 enters the notch 14 and holds the stop 13 out of the path of the pins 20. As the half gear wheel 12 rotates it imparts a corresponding movement to the pinion 10, bar 9 and ratchet wheel 7, thereby causing the shaft 1 to rotate faster than the shaft 4 and operating the tally or registering mechanism at a higher speed than the movement of the meter, the speed being proportionate to the increase of pressure of the gas passing through the meter over and above the standard or predetermined pressure. The bar 21 is moved a distance determined by the pressure and when the disk 19 moves the half gear wheel 12 to a point to bring the stop 13 in engagement with the projection 22, said stop is tripped and thrown out of the path of the pins 20. When the pressure within the meter exceeds the normal it causes a deflection of the diaphragm 30 and causes the rod 27 to move outward and to operate the toothed sector 24, which latter rotates the bar 21 so as to withdraw the projection 22 from the stop 13, the position of the projection 22 depending upon the amount of deflection of the diaphragm 30. It is to be understood that the tension of the spring 40 is such as to offer a greater or less resistance to the movement of the diaphragm, the tension being regulated by the stop 35. When there is no excess of pressure over four ounces, or any desired delivery pressure on the meter, the bar 21 occupies a position to hold the projection 22 within the notch 14 of the stop 13, thereby throwing said stop out of the path of the pins 20, with the result that the tally or registering mechanism a corresponds with the meter movement. When the pressure of gas in the meter exceeds the predetermined pressure the diaphragm 30 is deflected and moves the rod 27 and the latter in turn operates the toothed sector 24, which in turn moves the bar 21 and withdraws the projection 22 from the stop 13, the latter being thrown into the path of the pins 20 of the disk 19, with the result that the half gear wheel 12 is operated and rotates the shaft 1 faster than the shaft 4 in the manner stated. The increased movement of the shaft 1 over the shaft 4 is regulated by the adjustment of the length of travel of the rod 27, which in turn controls the position of the part 21 so that the movement of the half gear wheel 12 may be regulated, the same being thrown out of action when the stop 13 is tripped by the part 22. The movement of the shaft 1 increased in the manner set forth at certain intervals in the movement of the meter, that is during the multiplying movement, causes the tally a to register the increased movement in addition to the regular meter registering, which continues the operating of shaft 1 after the multiple movement has finished and using the same tally as before to register the meter movement. It is observed that the tally registers the volume without necessitating the provision of a clock movement or the attachment of charts which latter are required to be changed at stated intervals. The registering mechanism acts automatically with such precision as required by the fluctuations of pressure within the casing containing the diaphragm 30.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. Mechanism for registering the volume of gas or other elastic fluid passing through a meter, said mechanism being actuated by any excess of pressure over a prearranged degree, the operating mechanism for the registering mechanism including a meter operated shaft and a register operating shaft geared to the meter operating shaft to rotate therewith at a like speed, a movement adapted to be actuated by the meter operated shaft for imparting a faster movement to the register operating shaft including a ratchet mechanism, a mechanism adapted to be operated by any excess of pressure of the gas or elastic fluid passing through the meter, and a trip mechanism operated by the pressure operated mechanism to throw the mechanism between the two shafts into or out of operation, whereby at stated intervals the registering mechanism is caused to register a movement greater than the meter movement proportionate to the excess of pressure within the meter over and above the prearranged pressure.

2. Operating mechanism adapted to be actuated by the movement of a meter for registering the passage of a fluid therethrough and adapted to operate a register for noting the volume of fluid passing through the meter at a given pressure or any excess thereof, said mechanism comprising a meter operated shaft and a register operating shaft, gearing between the two shafts including a ratchet mechanism for causing the same to rotate at a like speed, other gearing between the two shafts for actuating the register operating shaft at a higher speed than the meter operated shaft proportionate to the excess of pressure of the fluid passing through the meter over and above the given or normal pressure, a mechanism adapted to be operated by an excess of pressure of the fluid passing through the meter, and means adapted to be operated by the fluid pressure controlled mechanism for operating the second set of gearing between the meter operated and the register operating shafts.

3. In an operating mechanism for transmitting movement from a meter to a register for indicating excessive pressure within the meter, the combination of a meter operated shaft and a register operating shaft, gearing between the two shafts including a ratchet mechanism for causing them to rotate at a like speed when the pressure within the meter is normal, a second gearing between the two shafts for rotating the register operating shaft at a higher speed when the pressure of the fluid passing through the meter is in excess of the normal pressure, pressure controlled mechanism adapted to be operated by an excess of pressure within the meter, a mechanism between the meter operated shaft and said second gearing including coöperating elements adapted to be thrown into or out of action, and means adapted to be operated by the fluid pressure controlled mechanism for throwing the connecting elements into engaging position, whereby said second set of gearing is brought into operation when the pressure within the meter is in excess of the normal pressure.

4. A mechanism for transmitting movement from a meter to a register comprising a meter operated shaft and a register operating shaft, a gear wheel fast to the meter operated shaft, a second gear wheel loose upon the register operating shaft, a ratchet wheel secured to the register operating shaft, a pawl for transmitting movement from the aforesaid second gear wheel to the ratchet wheel, a bar loose upon the register operating shaft, a pawl connecting said bar with the ratchet wheel, a pinion rotatable with said bar, a half gear loose upon the meter operated shaft and adapted to mesh with said pinion, a spring for holding the half gear in a given position, a stop carried by the half gear, a disk fastened to the meter operated shaft and provided with pins to engage with the stop mounted upon the said half gear, a bar loose upon the meter operated shaft and provided with a projection to engage with and trip said stop to throw the same out of the path of the pins carried by said disk, a fluid pressure controlled mechanism, and means operated by said fluid pressure controlled mechanism for moving the bar to disengage the projection thereof from the stop to admit of engagement of the pins of said disk therewith.

5. In mechanism for transmitting movement from a meter to a register, the combination of a meter operated shaft 4, a register operating shaft 1, a gear wheel secured to the shaft 4, a gear wheel loose upon the shaft 1 and in mesh with the first mentioned gear wheel, a ratchet wheel 7 secured to the shaft 1, a pawl adapted to engage the teeth of the ratchet wheel and carried by the gear wheel loose on shaft 1, a bar 9 loose on shaft 1 and provided with a pawl to engage with the teeth of the ratchet wheel 7, a pinion 10 rotatable with the bar 9, a gear element 12 loose upon the shaft 4 and in mesh with the pinion 10, a spring for holding the gear element 12 in given position, a stop 13 mounted upon the gear element 12, a disk 19 secured to the shaft 4 and provided with pins to engage the stop 13, a bar 21 loose upon the shaft 4 and having a projection 22 for engagement with a stop 13 to throw the same out of the path of the pins carried by the disk 19, a pinion 23 rotatable with bar 21, a toothed sector in mesh with the pinion 23, and a fluid pressure controlled mechanism for operating the toothed sector substantially as and for the purpose specified.

6. In a mechanism of the character set forth, the combination of a meter operated shaft 4, a register operating shaft 1, gearing between the two shafts including a ratchet wheel 7 and pawl 8, a second set of gearing between the two shafts including gear elements 10 and 12 loose upon the respective shafts 1 and 4, the gear element 10 having a ratchet connection with the ratchet wheel 7, a stop carried by the gear element 12, a member fastened to the shaft 4 and having a projecting part to engage the said stop, an element 21 loose upon the shaft 4 and having a projection to trip the said stop and hold the same out of the path of the projection of the part 19, a fluid pressure controlled mechanism, and means for operating the element 21 by means of said fluid pressure controlled mechanism.

7. In a mechanism of the character set forth, the combination of a meter operated shaft 4, a register operating shaft 1, gearing between the two shafts including a ratchet wheel 7 and pawl 8, a second set of gearing between the two shafts including gear elements 10 and 12 loose upon the respective shafts 1 and 4, the gear element 10 having a ratchet connection with the ratchet wheel 7, a stop carried by the gear element 12, a member fastened to the shaft 4 and having a projecting part to engage the said stop, an element 21 loose upon the shaft 4 and having a projection to trip the said stop and hold the same out of the path of the projection of the part 19, the same comprising a rod 27, a spring for moving said rod in one direction, means for moving said rod in an opposite direction by excess of fluid pressure, and means for transmitting movement from the rod 27 to the element 21.

In testimony whereof I affix my signature in presence of two witnesses.

RICHARD G. DOWINS.

Witnesses:
  C. A. GEORGE,
  JOHN G. KIMBALL.

---

Copies of this patent may be obtained for five cents each, by addressing the "Commissioner of Patents, Washington, D. C."